July 15, 1969  R. P. BECKMAN  3,454,968
AUTO BABY HAMMOCK

Filed Oct. 9, 1967  2 Sheets-Sheet 1

*INVENTOR*
ROBERT P. BECKMAN

BY Sughrue, Rothwell, Mion,
Zinn + Macpeak
*ATTORNEYS*

July 15, 1969   R. P. BECKMAN   3,454,968
AUTO BABY HAMMOCK
Filed Oct. 9, 1967   2 Sheets-Sheet 2

INVENTOR
ROBERT P. BECKMAN

BY
ATTORNEYS

United States Patent Office 3,454,968
Patented July 15, 1969

3,454,968
AUTO BABY HAMMOCK
Robert P. Beckman, N. Plum St.,
Columbus Grove, Ohio 45830
Filed Oct. 9, 1967, Ser. No. 673,830
Int. Cl. A47d 7/04
U.S. Cl. 5—94                                      9 Claims

ABSTRACT OF THE DISCLOSURE

A baby hammock for automobiles having an open-topped cradle suspended from the automobile roof and constrained at one end from forward movement.

BACKGROUND OF THE INVENTION

Field of the invention

The invention relates to baby hammocks for use in automobiles, and more particularly to a suspension system for such a hammock which would protect the baby from road shock and from injury in case of sudden stop.

Description of the prior art

Various devices have been used for carrying infants in automobiles. Cradles, more commonly known as "car beds," are used for infants too young to sit. Such car beds have uniformly been rigidly attached to a solid structure in the automobile. These car beds have been provided with a great amount of padding to protect the infant, or they have been constructed of soft, flexible material. Such devices have not proven to be entirely satisfactory since rigid attachment to the vehicle provides a path for the transmission of road shock to the cradle and possible injury to the infant in cases of accident or sudden stop.

SUMMARY OF THE INVENTION

According to the present invention, a baby hammock is suspended from an upper part of an automobile by a system of ropes. Pulleys are provided on the hammock through which the ropes are threaded. The ropes may be attached either to the coat hooks or the rain gutters of the automobile. The end of the hammock at which the baby's head is placed is constrained from forward movement by a strap connected to the rear passenger seat.

DETAILED DESCRIPTION

Figure 1:
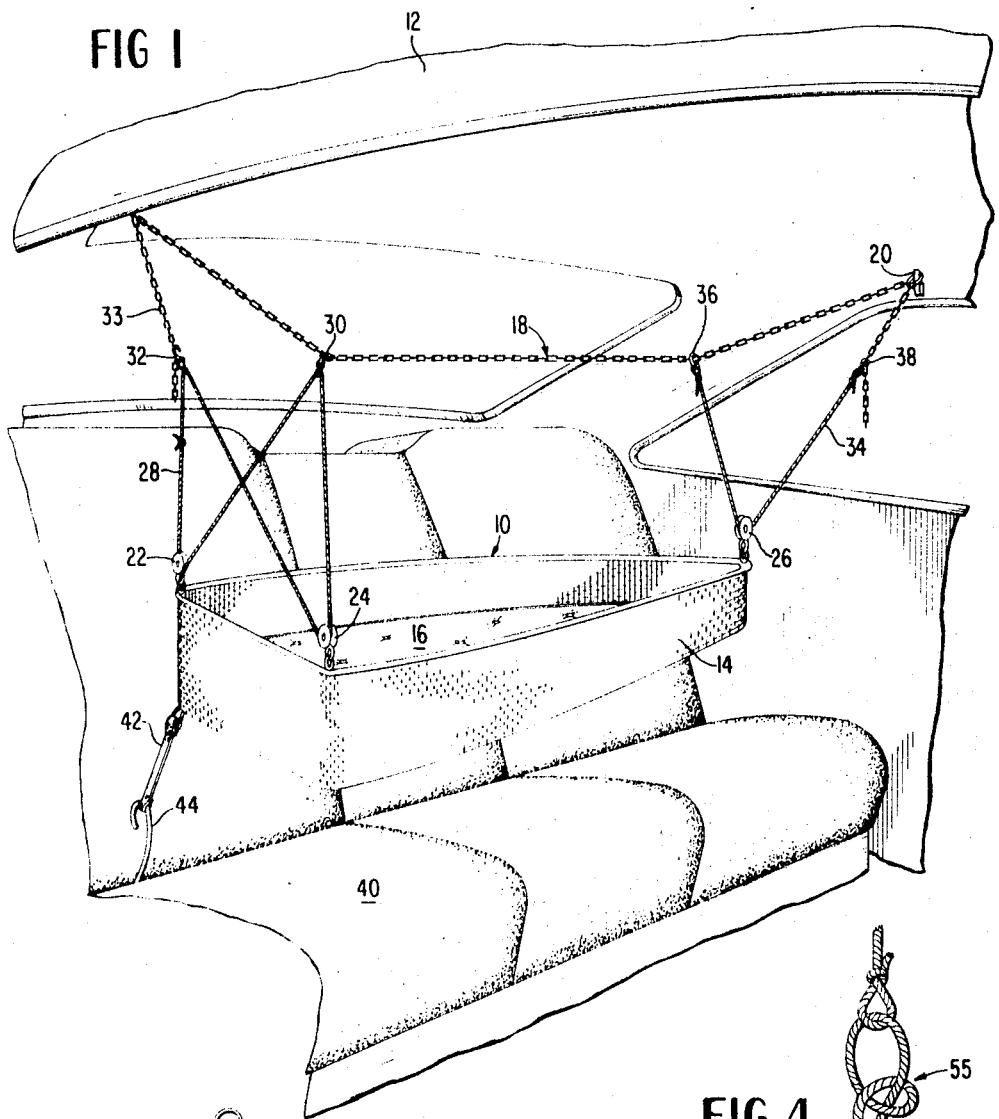
FIGURE 1 is a perspective view of the auto baby hammock mounted in an automobile.
Figure 2:
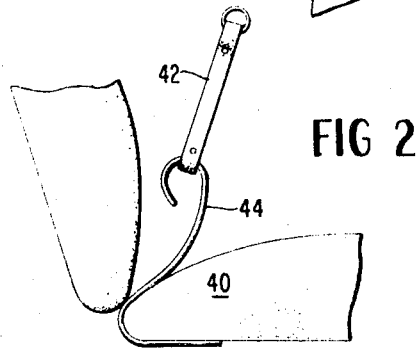
FIGURE 2 is a side elevational detailed view of the seat hook and elastic cord shown in FIGURE 1.

Referring to the drawings, FIGURE 1 shows the cradle 10 as suspended from the vehicle roof 12. The cradle is preferably of generally triangular shape and large enough to hold a baby comfortably. A cradle shell 14 is preferably constructed of wicker material, but it will be recognized by those skilled in the art that any suitable materials such as metal bars with cloth or rope webbing may be used. A suitable pillow 16 is provided at the bottom of the cradle, and chest straps may be used to prevent the baby from slipping.

A chain 18 is suspended laterally across the vehicle from coat hooks 20, of which only one is shown in the drawings. Pulleys 22, 24 and 26 are provided in the corners of cradle 10. Rope 28 is attached to chain 18 at a point 30 spaced laterally inwardly from one coat hook 20. The rope extends from point of attachment 30 in two directions towards pulleys 22 and 24, respectively. After being threaded through those pulleys, rope 28 extends upwardly and outwardly to point 32 of that portion 33 of chain 18 which depends from hook 20.

Rope 34 is attached at one end to chain 18 at a point 36 spaced laterally inwardly of pulley 26. Rope 34 is threaded through pulley 26 and attached at its other end to chain 18 at a point 38 which depends from coat hook 20.

Figure 4:
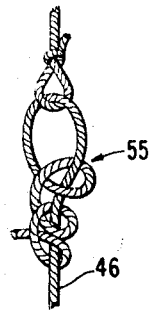
FIGURE 4 is a detail view of two slip knots provided in the suspension means of FIGURE 3.

As can be more readily seen in FIGURE 4, hooks 30, 32, 36 and 38 are provided at the points of attachment of ropes 28 and 34 to chain 18. Thus, the effective length of the chains 33 and 38 can be varied to adjust the height and the angle of the hammock, or to adapt the hammock to different widths of automobiles.

The head end of the cradle is resiliently attached to a rear seat 40 of the automobile by an elastic strap 42 and metal seat hook 44. Due to the restraint imposed upon the cradle by elastic strap 42, the end of cradle 10 at which the baby's head is positioned will have less swing in case of collision or sudden brake application than the opposite end. Therefore, under these conditions, the baby will be positioned in a manner that the least possible amount of injury will be incurred. It will be apparent that elastic strap 42 may be replaced by any other restraining means, such as for instance a chain or nonelastic strap.

Figure 3:
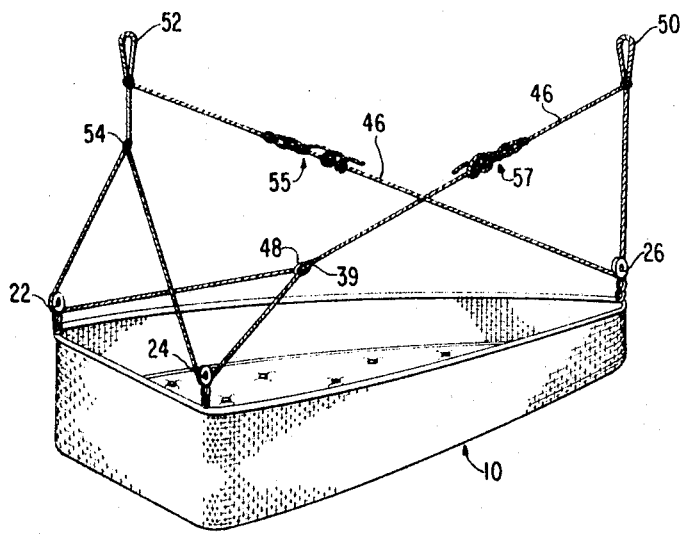
FIGURE 3 is a perspective view showing a modification of the suspension means of FIGURE 1.

In the embodiment shown in FIGURE 3, provision has been made for attachment of the cradle suspension ropes directly to the coat hooks without the need of providing chain 18. A rope 46 is provided with a loop 48 at one end. Rope 46 extends upwardly and outwardly from loop 48 to form a loop 50 at a point in space above and to the outside of pulley 26. From loop 50, rope 46 is threaded through pulley 26 and extends to a point above and between pulleys 22 and 24, where a third loop 52 is tied in the rope. From loop 52, the rope is threaded through pulley 22, loop 48 and pulley 24. The free end of rope 46 is tied to point 54 below loop 52. A pair of slip knots 55 and 57 are provided in rope 46 so that the effective length of the rope 46 can be varied to adjust the height and the angle of the hammock, or to adapt the hammock to different widths of automobiles. The slip knots are better shown in FIGURE 4.

Figure 5:
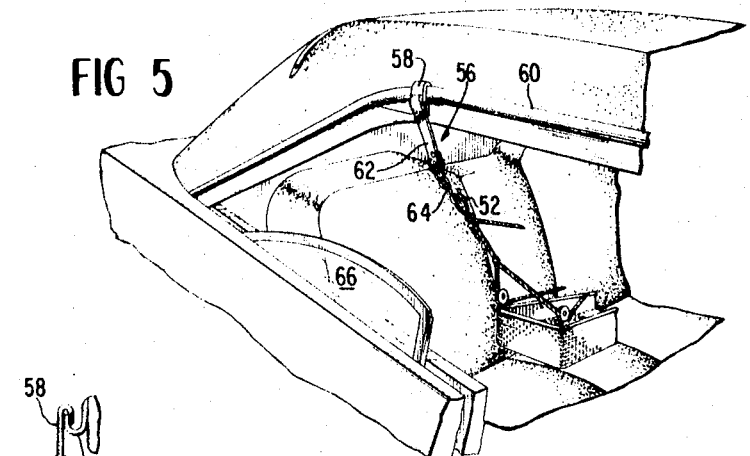
FIGURE 5 is a perspective view showing a bracket for attaching the baby hammock to a rain gutter of an automobile.
Figure 6:
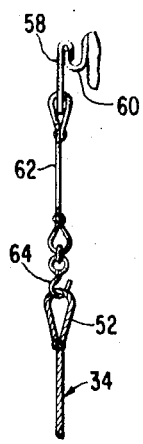
FIGURE 6 is a detailed elevation view of the bracket shown in FIGURE 5.

The suspension rope arrangement of FIGURE 4 may be attached to coat hooks 20, or alternatively, to a rain gutter bracket 56 shown in FIGURES 5 and 6. Such a bracket is provided for automobiles which do not have coat hooks. Brackets 56 include metal hooks 58 which are formed to cooperate with rain gutters 60. Flexible straps 62 depend from hooks 58 and have wire hooks 64 at their opposite ends for attachment of loops 50 and 52. Straps 62 are flexible and of a light enough material to permit the rear window 66 to be fully closed.

When the cradle is not being used as an automobile hammock, the suspension ropes may be tucked under pillow 16 so that the cradle may be easily carried. Handles (not shown) may be provided on the shell 14 for this purpose.

While the invention has been particularly shown and described with reference to the preferred embodiments thereof, it will be understood by those skilled in the art that various changes in form and details may be made therein without departing from the spirit and scope of the invention.

What is claimed is:
1. A baby hammock for use in automobiles comprising:
   (a) an open top elongated hollow cradle shell having a sidewall about its periphery and a bottom wall;
   (b) flexible suspension means depending from an upper part of the automobile and attached to said sidewall at each end of said shell, respectively; and
   (c) flexible restraint means independent from said suspension means connected to the automobile and to the cradle shell for constraining one end of said shell from forward movement, the other end of the shell being free to move in a substantially horizontal plane when the automobile is subject to sudden deceleration.

2. A hammock for use in automobiles as defined in claim 1 wherein the means constraining said one end of said shell is an elastic cord attached at one end to the rear passenger seat and at the other end to said one end of the shell.

3. A hammock for use in automobiles as claimed in claim 1 wherein the suspension means further includes a pair of flexible flat straps which extend through the automobile windows, said straps having a hook on one end for attachment to rain gutters of the vehicle.

4. A hammock for use in automobiles as defined in claim 1 wherein the suspension means includes:
   (a) first and second pulleys attached to the top edge of said side wall at said one end of said shell;
   (b) a third pulley attached to the top edge of said side wall at said other other end of said shell;
   (c) first and second ropes threaded through said first and second pulleys and joined at their ends in the vertical plane which longitudinally bisects the hammock, the ends of said ropes being attached to an upper segment of the automobile; and
   (d) a third rope threaded through said third pulley and lying entirely in said vertical plane, the ends of said third rope being attached to the upper segment of the automobile.

5. A hammock for use in automobiles as defined in claim 4 wherein slip knots are provided in at least one of said ropes to permit adjustment of the height of the hammock.

6. A hammock for use in automobiles as defined in claim 4 in which the suspension means further includes: a chain extending transversely of the automobile in said vertical plane and attached on both ends to the upper segment of the automobile, one end of each of said ropes being attached to said chain outside the periphery of said side wall and the other ends of each of said ropes being attached to said chain inside the periphery of said side wall.

7. A hammock for use in automobiles as defined in claim 4 wherein the suspension means further includes a pair of flexible flat straps which extend through the automobile windows, said straps having a hook on one end for attachment to the vehicle's rain gutters and a hook on the other end for attachment to the ends of said ropes.

8. A hammock for use in automobiles as defined in claim 4 wherein one end of each of said ropes are joined in said vertical plane at a first point where they are attached to the vehicle and the other ends of said ropes are joined in said vertical plane at a second point where they are attached to the vehicle.

9. A hammock for use in automobiles as defined in claim 8 wherein said ropes are attached at said first and second points to one end of a pair of flat flexible strips, respectively; the other ends of said strips being provided with hooks for attachment to the vehicle rain gutters.

References Cited

UNITED STATES PATENTS

| | | | |
|---|---|---|---|
| 1,885,493 | 11/1932 | Tyler | 5—94 |
| 3,203,011 | 8/1965 | Faludi | 5—94 |
| 3,203,012 | 8/1965 | Roberts | 5—120 |
| 3,349,413 | 10/1967 | Merelis | 5—94 |

CASMIR A. NUNBERG, Primary Examiner

U.S. Cl. X.R.

5—118